Aug. 11, 1964   E. TANIS ETAL   3,143,765
PULL-THROUGH LEADER SEAL
Filed March 25, 1963   3 Sheets-Sheet 1
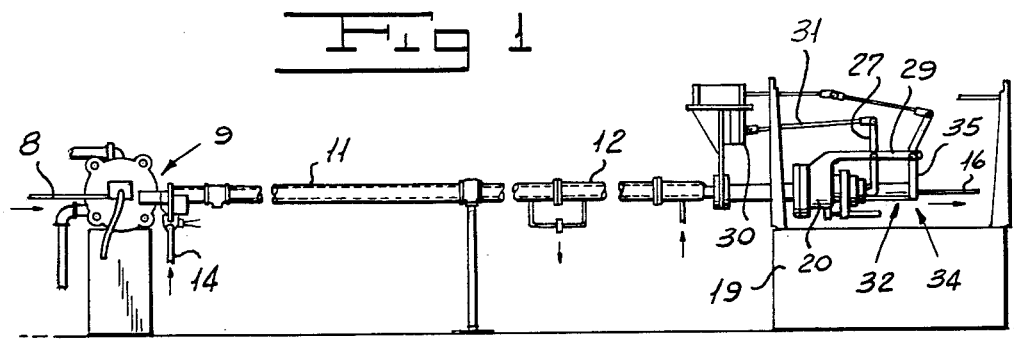
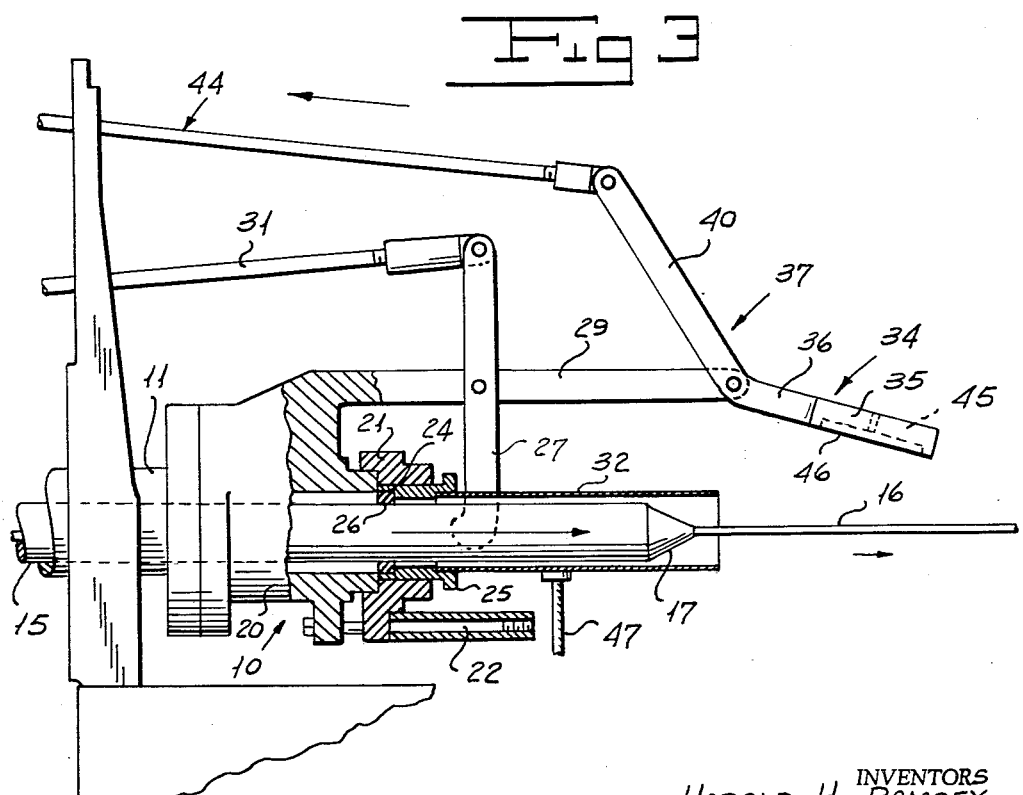
INVENTORS
HAROLD H. RAMSEY
EDWARD TANIS
BY
ATTORNEY

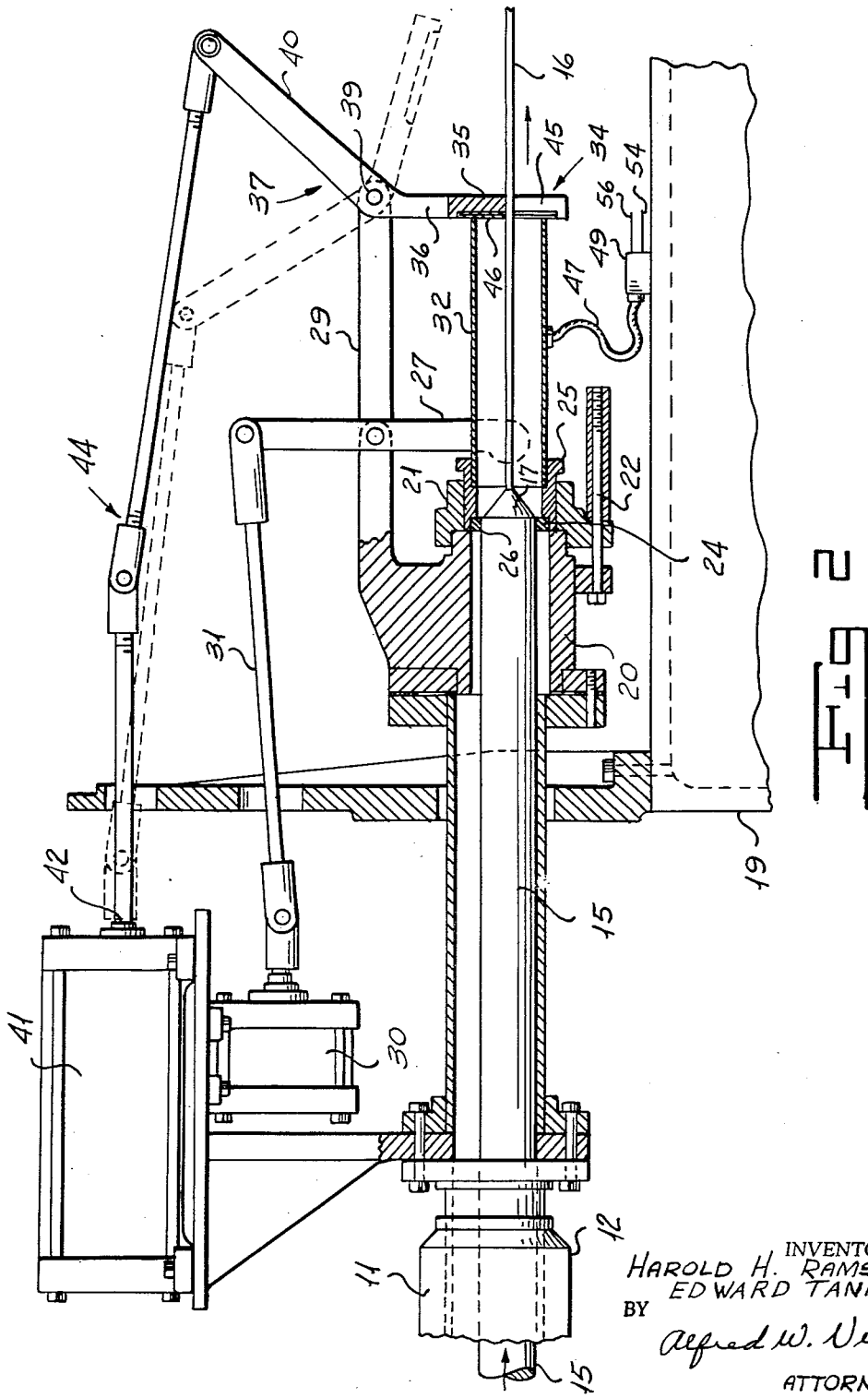

Aug. 11, 1964  E. TANIS ETAL  3,143,765
PULL-THROUGH LEADER SEAL
Filed March 25, 1963  3 Sheets-Sheet 3
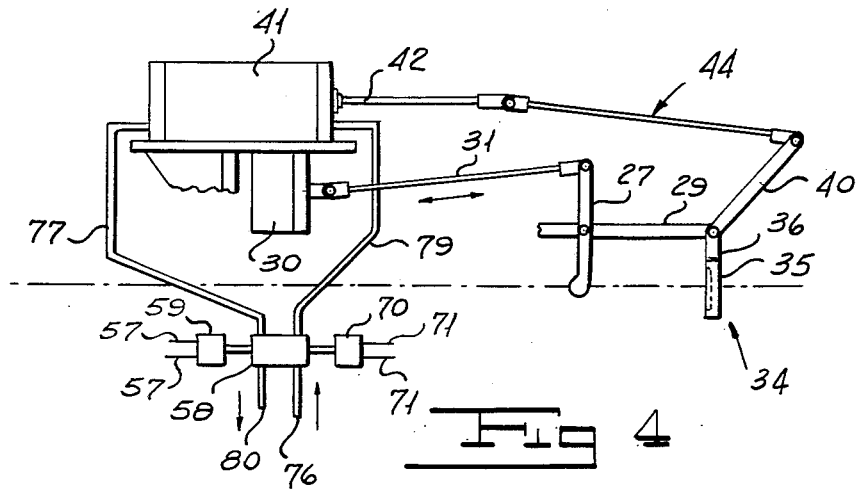
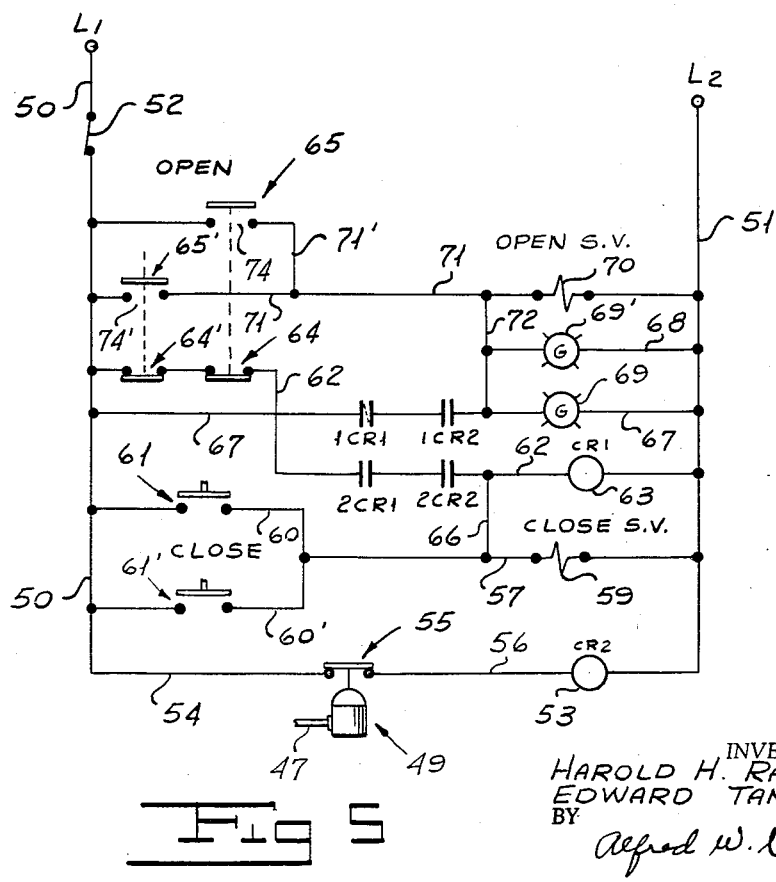
INVENTORS
HAROLD H. RAMSEY
EDWARD TANIS
BY Alfred W. Nibber
ATTORNEY United States Patent Office 3,143,765
Patented Aug. 11, 1964

3,143,765
PULL-THROUGH LEADER SEAL
Edward Tanis, 20 Heights Road, Midland Park, N.J., and Harold H. Ramsey, 381 Godwin Ave., Wyckoff, N.J.
Filed Mar. 25, 1963, Ser. No. 267,416
11 Claims. (Cl. 18—6)

This invention relates to apparatus for temporarily closing to a substantial extent the end of a pressure vessel through which a leader or pull-through cable passes.

In various types of material-treating apparatus, elongated material is treated in and withdrawn from a vessel or chamber under fluid pressure. Typical of such treating devices is a continuous vulcanizing apparatus in which elongated vulcanizable material, such as a sheathed cable, is continuously fed through an elongated chamber containing steam under high pressure. After passing through the vulcanizing chamber, the material is usually fed into a cooling chamber, and then through an exit seal into the atmosphere.

Under steady operating conditions, in which the elongated material extends continuously from the entrance end of the vulcanizing chamber through the seal at the exit end of the cooling chamber, no particular difficulty is encountered in providing a reasonably tight seal between such material and the exit end of the cooling chamber. Difficulty arises, however, in starting a continuous vulcanizing operation. This involves the stringing up of the vulcanizing apparatus, that is, attaching a leader or pull-through cable to the forward end of the material and pulling the leader and the attached material through a chamber and out the exit seal.

Since a continuous vulcanizing device, including the steam filled vulcanizing chamber and the cooling portion thereof, is usually on the order of from 175 to 200 feet or more long, it is uneconomical not to vulcanize the leading end of the material as it is pulled through the chamber by the leader, particularly if the material is, for example, a large cable. In order that the elongated material shall be uniformly and properly vulcanized, it is necessary to maintain it under the optimum high pressure and high temperature conditions of the chosen vulcanizing cycle. The leader, however, is usually of a markedly smaller diameter than sheathed cable, so that a high rate of leakage of fluid occurs at the usual exit seal when only the leader is passing therethrough. The rate of leakage increases as the difference between the diameter of the material being treated and the leader increases. In fact, with material of large diameter, in many instances the leakage is so high during such stringing-up and initial vulcanizing operation as to exceed the capacity of the pump or other means provided at the exit seal, to maintain pressure within the vulcanizing chamber. With such high rate of leakage, the leading end of the vulcanizable material can not be uniformly and properly vulcanized.

In accordance with apparatus disclosed and claimed in Van Riper Patent No. 2,883,702, there is employed at the zone of the main exit seal an auxiliary sealing means which closes off to a substantial extent the opening between the leader and the passage through the main seal. Such auxiliary seal cuts down the rate of leakage at the exit seal to such an extent that such leakage is controllable, and the pressure and temperature within the vulcanizing chamber may be built up to the values which they attain under the steady operating conditions of the apparatus which exist when the material itself extends through and establishes a substantial seal with the main exit seal of the chamber.

The auxiliary seal of such apparatus is removable from the path of the material through the exit seal, so that when the material itself reaches the exit zone of the chamber there is no obstruction to its free passage outwardly of the chamber. Preferably the auxiliary sealing means is so constructed as to be automatically movable out of the path of the material. When it is used with continuous vulcanizing apparatus, such as that shown in the above referred to Van Riper patent, it is merely necessary to place the auxiliary seal in operative position, to engage the pull-through leader with the material-pulling capstan, to start the capstan and the extruding apparatus for sheathing the cable, and to admit steam and cooling fluid, where necessary, to the vulcanizing and cooling zones of the elongated chamber, respectively.

The invention has among its objects the provision of an improved system for controlling a selectively used or auxiliary sealing means for a leader or pull-through cable in pressure-treating apparatus, employed for treating elongated material, such material passing through a main seal in such chamber.

The invention has among its objects, in a preferred embodiment thereof, the provision of an improved system for controlling a selectively used seal for a leader or pull-through cable in pressure-treating apparatus of the type indicated, such auxiliary sealing means being employed in conjunction with a main seal adjacent the exit end of such chamber.

The auxiliary sealing means should ideally open so as to be retracted from the path of the elongated material as soon as the necessity for the use of the auxiliary sealing means has ceased, so as to eliminate any possibility of damage to the auxiliary sealing means by the forward end of the material and/or the splice between the forward end of the material and the rear end of the pull-through leader. It has been proposed to actuate the auxiliary sealing means thus to retract it by an operator who is warned of the approach of the splice and the forward end of the material toward the auxiliary sealing means by a warning mark or tell-tale affixed to the pull-through leader. This manner of operating the auxiliary sealing means, however, depends for its success upon the close attention and quick response of the operator.

It has also been proposed to retract the auxiliary sealing means automatically by the interaction between a tell-tale or dog on the pull-through leader and a control means such as a switch, or as in Van Riper Patent No. 2,883,702, by an initial contact between the auxiliary sealing means and the splice between the material and the pull-through leader. Both of such systems have the possibility of being somewhat inexact as to the time of retraction of the auxiliary sealing means, and, provide little margin for error. The first depends upon the accurate relative adjustment of the dog on the pull-through leader and the switch or other control means with which the dog interacts. The second depends upon fairly exact initial yielding of the auxiliary sealing means, as well as initial adjustment of a dog and a switch, and thus likewise is difficult to adjust and to maintain in satisfactory working condition.

The apparatus of the present invention provides a simple, positive system for the retraction of the auxiliary sealing means to open position when it is necessary to do so. The apparatus of the invention prevents retraction of the auxiliary sealing means unless it is safe to do so, and positively retracts such auxiliary sealing means when it is necessary to do so. Such apparatus eliminates the adjustment of tell-tales or dogs relative to control devices such as switches, with their attendant possibility of human failure.

Generally speaking, the apparatus of the present invention employs means which detects the fluid pressure drop in that portion of the material-treating chamber between the main seal and the auxiliary sealing means which occurs when the forward end of the material has arrived at and established a substantial seal with the main seal. Upon the occurrence of such pressure drop, the pressure detecting means energizes power means which positively retracts the auxiliary sealing means to open position. The system of the present invention thus is simple, economical to make and maintain, and is positive in action.

A further object of the invention resides in the provision of an auxiliary sealing means and control therefor in pressure-treating apparatus of the type indicated which eliminates the possibility of failure of the control and consequent damage to the apparatus due to maladjustment of the control.

Yet another object of the invention lies in the provision of an auxiliary sealing means and control therefor wherein the control is responsive only to a condition within the pressure-treating apparatus which is inherently related to the establishment of a substantial seal with another seal so that the auxiliary sealing means can be opened only when its use is no longer necessary.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a foreshortened view in side elevation on a small scale of an illustrative continuous vulcanizing system having an auxiliary sealing means and a control therefor in accordance with the present invention, the chamber of the system being broken through and shortened in several places for economy of space in illustration;

FIG. 2 is a fragmentary view in longitudinal vertical section through the exit end of the continuous vulcanizing system of FIG. 1, the figure showing elongated vulcanizable material travelling through the chamber of the system and about to establish a substantial seal with the main seal of the system, certain of the parts being shown in elevation;

FIG. 3 is a fragmentary view in vertical axial section through the exit end of the apparatus showing the auxiliary sealing means retracted into open, inoperative position, a sheathed cable being shown passing through the main exit seal of the apparatus;

FIG. 4 is a somewhat schematic view of the controls for the auxiliary sealing means, such controls being shown in combination with the controls for the main exit seal of the chamber; and FIG. 5 is a schematic wiring diagram of the control system for the auxiliary sealing means of the invention.

In FIG. 1 there is shown generally on a greatly reduced scale a continuous vulcanizing system for the vulcanizing of a rubber or a rubber-like sheath which is extruded onto a cable 8. The unsheathed cable enters the head of an extrusion machine 9 where it receives the sheath which is extended thereabout. The sheathed cable travels outwardly through a die in the head of the extrusion machine into the entrance end of a continuous vulcanizing chamber, the die of the extrusion head serving as an entrance seal for such chamber. The sheathed cable is pulled through the vulcanizing chamber by capstan means (not shown), the cable travelling progressively through a first, vulcanizing zone in the chamber containing steam under high pressure, which is introduced thereinto through a pipe 14, and then into and through a second, cooling zone containing water in which it is immersed. The chamber at the cooling zone is provided with an inner conduit 11 which is surrounded by one or more cooling jackets 12, which are filled with circulating water isolated from that in the inner conduit 11. After passing through the cooling chamber, the now vulcanized and at least semi-cooled elongated material issues therefrom through sealing means at the exit end 10 of the cooling chamber.

The elongated vulcanized material, which in this instance is a sheathed cable, is designated by the reference character 15. During the stringing-up of the system at the start of a run, a pull-through leader or cable 16 is joined to the forward end of the material 15 coaxially thereof by a splice 17. As above explained, it is economically necessary that the forward portion of the material 15 be vulcanized by being subjected to steam under high pressure even though the forward end of the material 15 has not as yet reached and established a substantial seal with the main seal in the chamber. In FIG. 2 the material 15 is shown as having progressed to the point at which its forward end has just established such substantial seal with the main sealing means 24.

As shown in the drawings, particularly FIG. 2 thereof, the exit end 10 of the cooling chamber is supported on a bracket means 19 which extends, for example, from the floor. Fixedly secured to the support 19 is a main exit seal housing 20 which is affixed to and sealed to the exit end of the conduit 11. An annular member or sleeve 21 has the rear portion thereof telescoped over the forward end of housing 20; member 21 is mounted at its periphery for limited axial sliding motion on a plurality of elongated studs 22 which are angularly spaced about and projected rearwardly from the main seal housing 20. The main seal 24 is of conventional construction, and includes a radially slotted metallic diaphragm having a rubber-like annular sealing member 26 affixed to the rear face thereof.

The main seal 24 is capable of limited radial adjustment by being axially compressed to varied desired degrees between the rear annular face of the housing 20 and an axially slidable annular plunger 25, slidably mounted in sleeve 21. Plunger 25 has zones at the sides of the rear end thereof abutted by the lower ends of the arms of a bifurcated lever 27 which is pivotally mounted, as shown, upon an overarm 29 which projects rearwardly from the upper rear edge of the main seal housing 20. Lever 27 is urged clockwise (FIG. 2), thus to adjust the main seal 24 as required, by a fluid motor 30 the piston rod of which is connected to the upper end of lever 27 by a link 31. Ordinarily, the main seal 24 is opened somewhat when the system is being strung-up, motor 30 being actuated to contract seal 24 upon material 15 passing therethrough once the splice 17 has passed through the chamber. Even with the seal 24 opened to its widest extent, however, the entry of the material 15 into such seal establishes a substantial seal therewith, such seal being sufficient to cause the actuation of the means, to be described, which controls the auxiliary sealing means so as to retract such latter sealing means to its open, inoperative position.

An extension conduit 32 is connected and sealed to the rear end of plunger 25 coaxial with conduit 11. An auxiliary sealing means, generally designated 34, is mounted so as to cooperate with the rear end of conduit extension 32, the auxiliary sealing means 34 shown being generally of the type disclosed and claimed in Van Riper Patent No. 2,883,702. Such auxiliary sealing means includes a disc-like body 35 having its upper portion secured to the lower end 36 of a first-class lever 37 which is pivotally connected to overarm 29 by a pivot pin 39. The upper arm 40 of lever 37 is actuated by a double-acting reciprocable fluid motor 41, the piston rod 42 of such motor being connected to the upper end of lever arm 40 by a link 44. When the piston rod 42 of motor 41 is extended to the right, auxiliary sealing means 34 lies in its lowered vertical closed position, as shown in solid lines in FIG. 2. When piston rod 42 is retracted to the left, the auxiliary sealing means 34 is raised into the dotted line position wherein it lies above the path of the material 15 passing outwardly of the conduit extension 32.

The body 35 of the auxiliary sealing means is radially inwardly slotted as shown at 45, such slot having a width somewhat exceeding the diameter of the pull-through leader 16. Secured in a seat in the forward face of body 35 is a rubber-like sealing disc 46 which has a radial slot aligned with but somewhat narrower than slot 45 in body 35. As a result of such construction, when the auxiliary sealing means is in its lowered, closed position, the disc 46, backed up by body 35, establishes a substantial seal with the pull-through leader 16 passing therethrough.

The auxiliary sealing means 34 is under the control of means responsive to changes under pressure within the portion of the chamber lying between the main seal 24 and the auxiliary sealing means 34. In the illustrative preferred embodiment of the apparatus a pressure sensing means in the form of a pressure switch 49 is connected to the conduit extension 32 through a tube schematically shown at 47. The pressure switch 49 may conveniently be located upon a control panel (not shown) for the vulcanizing system. Switch 49, which may be conventional construction, is of a type having contacts which are closed when the fluid pressure supplied to the pressure sensitive means of the switch through pipe 47 is low. Thus, for example, if the continuous vulcanizing system normally operates under a pressure of 250 p.s.i. in the vulcanizing and cooling chambers, the switch 49 may be set so that its contacts are closed until the pressure receiving device of the switch is subjected to a pressure of 150 p.s.i., whereupon the contacts of the switch open. The manner in which the switch functions, in conjunction with the other elements of the system controlling the auxiliary sealing means, will be more readily apparent upon consideration of FIGS. 4 and 5 of the drawings.

As shown in FIG. 5, the electrical portion of the control system is powered from a source of electrical current $L_1$, $L_2$ which may, for example, be of 115 volts potential. A main wire 50 is connected to terminal $L_1$, and a wire 51 extends from terminal $L_2$. A manually operated switch 52 may be interposed in one of such wires, here shown at wire 50, in order to de-energize the entire system when desired. A wire 54 extends from wire 50 to one of the contacts of the pressure switch portion 55 of the device 49. A wire 56 extends from the other contact of such switch to wire 51, the coil 53 (labeled "CR2") of a relay switch being interposed in series in wire 56. A further wire 57 having a solenoid coil 59 (labeled "Close SV") interposed therein is connected to wire 51. Wire 57 extends to two parallel connected wires 60, 60', which are connected to wire 50 and are selectively opened and closed by normally open manually operated switches 61, 61' (labeled "Close"). One of swtiches 61, 61' will normally be positioned at one end of the continuous vulcanizing system, adjacent the extruding machine, and the other such switches will be positioned adjacent the exit end of the vulcanizing system. Also extending from wire 51 is a wire 62 which has interposed in series therein the coil 63 (labeled "CR1") of a relay switch and the contacts 2CR2 and 2CR1. Contacts 2CR2 are under the control of the relay coil 53 and are open when coil 53 is de-energized and are closed when coil 53 is energized. Contacts 2CR1 are under the control of the relay coil 63 and are open when coil 63 is deenergized and closed when such coil is energized.

Wire 62 continues from contacts 2CR1 to two normally closed manually operated contact-contactor sets 64, 64' connected in series and thence is connected to wire 50. The contact-contactor sets 64, 64' are parts of two manually operated "Open" switches 65, 65', one of which is usually located adjacent the extruding machine and the other of which is located adjacent the exit end of the cooling chamber of the vulcanizing system. Inwardly of relay coil 63 and solenoid coil 59 wires 57 and 62 are connected by a wire 66.

A wire 67 extends from wire 51 through a signalling device, such as a light 69 (labeled "G"), then to contacts 1CR2 and 1CR1 connected in series, wire 67 continuing so as to be connected to wire 50. Contacts 1CR2 are under the control of relay coil 53, and are open when coil 53 is de-energized and closed when coil 53 is energized. Contacts 1CR1 are under the control of relay coil 63, and are closed when coil 63 is de-energized and open when coil 63 is energized. Connected to wire 51 in parallel with wire 67 is a further wire 68 having a second signalling device, such as a lamp 69', interposed therein. A wire 71 having a solenoid coil 70 (labeled "Open SV") interposed therein extends from wire 51 to be branched at 71, 71'. Wires 71, 71' extend to wire 50, being selectively opened and closed by the upper normally open contcts and contactor means 74, 74' of the above described "Open" switches 65, 65'. The wiring system is completed by a wire 72 which connects the wires 67 and 71 inwardly of lamps 69, 69' and the solenoid coil 70, as shown.

FIG. 4 illustrates the manner of connection between the parts of the wiring diagram of FIG. 5 and those of the apparatus shown in FIGS. 1–4, inclusive. The auxiliary sealing means is powered, as above explained, by a double acting reciprocating fluid motor 41. Opposite ends of the cylinder of motor 41 are supplied with fluid, such as air under pressure, through pipes 77 and 79. A solenoid control valve, designated 58, is connected to pipes 77, 79, to a pipe 76 leading from a source of fluid pressure (not shown) and to an exhaust pipe 80. Valve 58, which may be of conventional construction, is under the control of the two solenoid coils 59 and 70, the valve being shifted so that fluid under pressure enters the cylinder of motor 41 through pipe 77 when solenoid coil 59 is energized, and so that fluid under pressure enters such cylinder through pipe 79 when solenoid coil 70 is energized.

When it is desired to close the auxiliary sealing means, prior to turning on the steam in the vulcanizing chamber, either of the "Close" switches 61, 61' is manually depressed and thus closed, thereby energizing solenoid coil 59 and the relay coil 63. Relay coil 63 thus closes contacts 2CR1, energizing a holding circuit composed of wire 62, relay coil 63, contacts 2CR2 and 2CR1, and closed contact-contactor sets 64 and 64'. Relay coil 53 is, of course, energized under such conditions through the closed pressure switch 5, so that contacts 1CR2 and 2CR2 are closed. The signal lights 69, 69' are extinguished when the auxiliary sealing means is closed.

If it is desired to open the auxiliary sealing means prior to turning on the steam pressure in the vulcanizing chamber, either of the "Open" switches 65, 65' may be depressed to their lower position thereby breaking the holding circuit by opening the connection between wires 62 and 50 and thus de-energizing relay coil 63. At the same time, the upper contact-contactor set of the one of switches 65 and 65' which has been operated will be closed, and thus will establish a circuit to energize solenoid coil 70, thereby shifting valve 58 to cause motor 41 to open the auxiliary sealing means. The signal lights 69, 69' are lighted when the auxiliary sealing means is open.

When an extruding and vulcanizing run is about to start, the pull-through will have been threaded through the vulcanizing and cooling chambers and will extend to a pull-through capstan, and means 34 will be in closed position, thus establishing a substantial seal with the leader 16. Cooling water may be introduced into the cooling zone of the system, and high pressure steam will be introduced into the vulcanizing zone of the system through pipe 14. High pressure conditions will then exit in conduit extension 32, and thus the pressure switch contacts 55 will open. Opening of the pressure switch contacts de-energizes relay coil 53, thus opening contacts 2CR2. The holding circuit is thus broken. The de-energizing of relay coil 53 also opens contacts 1CR2, thus keeping the solenoid coil 70 de-energized. The cable 15 may now be pulled through the continuous vulcanizing system at normal vulcanizing speed.

When the forward end of the cable 15 enters the main seal 24 of the vulcanizing chamber, pressure transmitting communication between the main part of the chamber and the conduit extension 32 is substantially cut off. As a result, the pressure in conduit 32 drops substantially, well below the predetermined pressure for which the pressure switch 49 is set, thereby causing the contact-contactor set 55 of the pressure switch to close. This energizes relay coil 53 which, in turn, causes contacts 1CR2 to close. Solenoid coil 70 is thus energized, and valve 58 then operates motor 41 to open the auxiliary sealing means. At the same time, contacts 2CR2 close, thus making the holding circuit ready for operation when it is desired again to close the auxiliary sealing means.

After the elongated material such as cable 15 has passed into the main seal 24, the motor 30 may be operated to cause the main seal to contract about such material and to engage it more firmly. The operator may be apprised of the time at which the main seal is thus to be contracted by a suitable tell-tale adjacent the trailing end of the pull-through leader 16, or by the automatic opening of the auxiliary sealing means as above described. As above explained, the pressure drop in conduit extension caused by the entry of material 15 into the main seal 24 is sufficient to cause pressure switch 49 to close, even though the main seal 24 is as yet not contracted into full contact with the material.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. Apparatus for subjecting elongated material to fluid under pressure which comprises a fluid-containing chamber through which the material travels in extended form, a main seal at one zone of the chamber longitudinally thereof, said main seal having a passage therethrough and adapted to cooperate with the material as it passes therethrough, means for introducing fluid under pressure into the chamber, and a retractable auxiliary sealing means at another zone of the chamber in tandem with and spaced substantially longitudinally of the chamber from the main seal, said auxiliary sealing means having an opening therethrough of a size sufficient to receive and to establish a substantial seal, when the auxiliary sealing means is closed, with a leader attached to an end of the material, said leader having a cross section substantially smaller than that of the material, means for selectively moving the auxiliary sealing means into closed position, in the path of the material, and into open position, out of the path of the material, and means responsive to a change in the pressure of the fluid in the chamber for actuating the means for moving the auxiliary sealing means.

2. Apparatus for subjecting elongated material to fluid under pressure which comprises a fluid-containing chamber through which the material travels in extended form, a main seal near an end of the chamber having a passage therethrough and adapted to cooperate with the material as it passes therethrough, means for introducing fluid under pressure into the chamber, and a retractable auxiliary sealing means at the end of the chamber in tandem with and spaced substantially outwardly of the main seal, said auxiliary sealing means having an opening therethrough of a size sufficient to receive and to establish a substantial seal, when the auxiliary sealing means is closed, with a leader attached to an end of the material, said leader having a cross section substantially smaller than that of the material, means for selectively moving the auxiliary sealing means into closed position, in the path of the material, and into open position, out of the path of the material, and means responsive to a change in the pressure of the fluid in the portion of the chamber between the main seal and the auxiliary sealing means for actuating the means for moving the auxiliary sealing means.

3. Apparatus for treating elongated material with fluid under pressure which comprises a fluid-containing chamber through which the material is drawn in extended form, a main seal near the exit end of the chamber having a passage therethrough and adapted to cooperate with the material as it passes therethrough, means for introducing fluid under pressure into the chamber inwardly of the chamber with respect to the main seal, and a retractable auxiliary sealing means at the exit end of the chamber in tandem with and spaced substantially outwardly of the main seal, said auxiliary sealing means having an opening therethrough of a size sufficient to receive and to establish a substantial seal, when the auxiliary sealing means is closed, with a pull-through leader attached to the forward end of the material, said leader having a cross section substantially smaller than that of the material, means for moving the auxiliary sealing means into open position, out of the path of the material, and means responsive to a change in the pressure of the fluid in the portion of the chamber between the main seal and the auxiliary sealing means upon the arrival of the material at the main seal for actuating the means for moving the auxiliary sealing means to retract the auxiliary sealing means into its open position.

4. Apparatus for treating elongated material with fluid under pressure which comprises a fluid-containing chamber through which the material travels in extended form, a main seal near an end of the chamber having a passage therethrough and adapted to cooperate with the material as it passes therethrough, means for introducing fluid under pressure into the chamber inwardly of the chamber with respect to the main seal, and a retractable auxiliary sealing means at the end of the chamber in tandem with and spaced substantially outwardly of the main seal, said auxiliary sealing means having an opening therethrough of a size sufficient to receive and to establish a substantial seal, when the auxiliary sealing means is closed, with a leader attached to an end of the material, said leader having a cross section substantially smaller than that of the material, means for moving the auxiliary sealing means into open position, out of the path of the material, and means responsive to the change in the pressure of the fluid in the portion of the chamber between the main seal and the auxiliary sealing means which is produced by the arrival of the material at the main seal for actuating the means for moving the auxiliary sealing means to retract the auxiliary sealing means into its open position.

5. Apparatus for treating elongated material with fluid under pressure which comprises a fluid-containing chamber through which the material is drawn in extended form, a main seal near an end of the chamber having a passage therethrough and adapted to cooperate with the material as it passes therethrough, means for introducing fluid under pressure into the chamber inwardly of the chamber with respect to the main seal, and a retractable auxiliary sealing means at the end of the chamber in tandem with and spaced substantially outwardly of the main seal, said auxiliary sealing means having an opening therethrough of a size sufficient to receive and to establish a substantial seal, when the auxiliary sealing means is closed, with a pull-through leader attached to the forward end of the material, said leader having a cross section substantially smaller than that of the material, means for moving the auxiliary sealing means into open position, out of the path of the material, and means responsive to the decrease in the pressure of the fluid in the portion of the chamber between the main seal and the auxiliary sealing means which is produced by the arrival of the material at the main seal for actuating the means for moving the auxiliary sealing means to retract the auxiliary sealing means into its open position.

6. Apparatus for treating elongated material with fluid under pressure which comprises a fluid-containing chamber through which the material is drawn in extended form, a main seal near the exit end of the chamber having a passage therethrough and adapted to cooperate with the material as it passes therethrough, means for introducing fluid under pressure into the chamber inwardly of the chamber with respect to the main seal, and a retractable auxiliary sealing means at the exit end of the chamber in tandem with and spaced substantially outwardly of the main seal, said auxiliary sealing means having an opening therethrough of a size sufficient to receive and to establish a substantial seal, when the auxiliary sealing means is closed, with a pull-through leader attached to the forward end of the material, said leader having a cross section substantially smaller than that of the material, means for selectively moving the auxiliary sealing means into closed position, in the path of the material, and into open position, out of the path of the material, a fluid pressure responsive element connected to the portion of the chamber between the main seal and the auxiliary sealing means, power means for actuating the means for moving the auxiliary sealing means, and means connecting the fluid pressure responsive element and the power means so that upon the arrival of the material at the main seal the power means is actuated to retract the auxiliary sealing means into its open position.

7. Apparatus for treating elongated material with fluid under pressure which comprises a fluid-containing chamber through which the material is drawn in extended form, a main seal near the exit end of the chamber having a passage therethrough and adapted to cooperate with the material as it passes therethrough, means for introducing fluid under pressure into the chamber inwardly of the chamber with respect to the main seal, and a retractable auxiliary sealing means at the exit end of the chamber in tandem with and spaced substantially outwardly of the main seal, said auxiliary sealing means having an opening therethrough of a size sufficient to receive and to establish a substantial seal, when the auxiliary sealing means is closed, with a pull-through leader attached to the forward end of the material, said leader having a cross section substantially smaller than that of the material, means for selectively moving the auxiliary sealing means into closed position, in the path of the material, and into open position, out of the path of the material, a fluid pressure responsive switch having a fluid pressure responsive element connected to the portion of the chamber between the main seal and the auxiliary sealing means, power means for actuating the means for moving the auxiliary sealing means, solenoid means for controlling said power means, and circuit means connecting the pressure responsive switch and the solenoid means so that upon arrival of the material at the main seal the power means is actuated to retract the auxiliary sealing means into its open position.

8. Apparatus as claimed in claim 7, comprising means for selectively controlling the power means manually, when the chamber is under substantially atmospheric pressure, selectively to close the auxiliary sealing means and to retract it to open position.

9. Apparatus as claimed in claim 7, wherein the circuit means comprises switch means for selectively controlling the power means manually, when the chamber is under substantially atmospheric pressure, selectively to close the auxiliary sealing means and to retract it to open position.

10. Apparatus wherein elongated material is subjected to fluid under pressure, which comprises a fluid-containing chamber through which the material travels in extended form, a main seal at one zone of the chamber longitudinally thereof, said main seal having a passage therethrough and adapted to cooperate with the material as it passes therethrough, means for introducing fluid under pressure into the chamber, and a retractable auxiliary sealing means at another zone of the chamber in tandem with and spaced substantially longitudinally of the chamber from the main seal, said auxiliary sealing means having an opening therethrough of a size sufficient to receive and to establish a substantial seal, when the auxiliary sealing means is closed, with a member attached to an end of the material, said member having a cross section substantially smaller than that of the material, means for selectively moving the auxiliary sealing means into closed position, in the path of the material, and into open position, out of the path of the material, and means responsive to a change in the pressure of the fluid in the chamber caused by the entry of the material into the main seal for actuating the means for moving the auxiliary sealing means to retract the auxiliary sealing means into its open position.

11. Apparatus wherein a first, elongated cylindrical member is subjected to fluid under pressure, which comprises a chamber through which the material travels in extended form, a main seal at one zone of the chamber longitudinally thereof, said main seal having a passage therethrough and adapted to cooperate with the cylindrical member as such member passes therethrough, means for introducing fluid under pressure into the chamber, and a retractable auxiliary sealing means at another zone of the chamber in tandem with and spaced substantially longitudinally of the chamber from the main seal, said auxiliary sealing means having an opening therethrough of a size sufficient to receive and to establish a substantial seal, when the auxiliary sealing means is closed, with a second elongated cylindrical member attached to an end of the first member said second member having a cross section substantially smaller than that of the first member, means for moving the auxiliary sealing means into open position, out of the path of the first member, and means responsive to a change in the pressure in the portion of the chamber between the main seal and the auxiliary sealing means for moving the auxiliary sealing means to its open position.

References Cited in the file of this patent

UNITED STATES PATENTS

| | | |
|---|---|---|
| Re. 19,820 | Cherry et al. | Jan. 14, 1936 |
| 2,540,497 | Steigler | Feb. 6, 1961 |
| 2,883,702 | Van Riper | Apr. 28, 1959 |
| 2,908,035 | De Haan | Oct. 13, 1959 |